United States Patent
Eiraku et al.

(10) Patent No.: US 6,902,285 B2
(45) Date of Patent: Jun. 7, 2005

(54) DISPLAY APPARATUS AND BACKLIGHT APPARATUS

(75) Inventors: Takayuki Eiraku, Kawasaki (JP); Seiji Hayashimoto, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 10/156,454

(22) Filed: May 28, 2002

(65) Prior Publication Data

US 2003/0123243 A1 Jul. 3, 2003

(30) Foreign Application Priority Data

Dec. 28, 2001 (JP) .......................................... 2001-399593

(51) Int. Cl.⁷ ................................................. G02F 1/13
(52) U.S. Cl. .......................... 362/26; 362/31; 362/330; 362/29; 362/27; 362/561
(58) Field of Search ............................. 349/65, 66, 67, 349/68, 69, 70; 362/31, 330, 29, 26, 27, 561

(56) References Cited

U.S. PATENT DOCUMENTS 5,818,555 A  *  10/1998  Yokoyama et al. ........... 349/67
6,295,105 B1  *  9/2001  Lee et al. ..................... 349/65

FOREIGN PATENT DOCUMENTS

WO        WO 01/18596        3/2001

* cited by examiner

*Primary Examiner*—Stephen Husar
*Assistant Examiner*—Anabel Ton
(74) *Attorney, Agent, or Firm*—Greer, Burns & Crain, Ltd

(57) ABSTRACT

A display apparatus comprises a display element, a backlight apparatus provided behind the display element and having a metal case, and a housing accommodating the display element and the backlight apparatus. In the display apparatus, electric wires for providing power to the backlight apparatus extend between the metal case of the backlight apparatus and the housing, and at least one opening is provided in the metal case in a part where the electric wires extend.

5 Claims, 5 Drawing Sheets

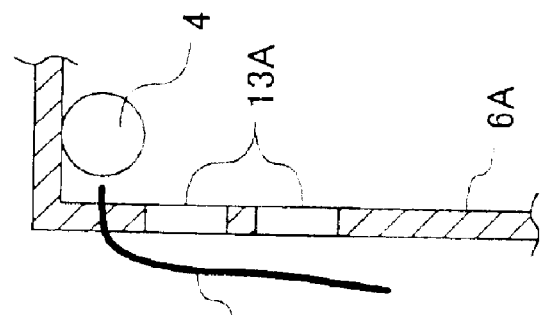
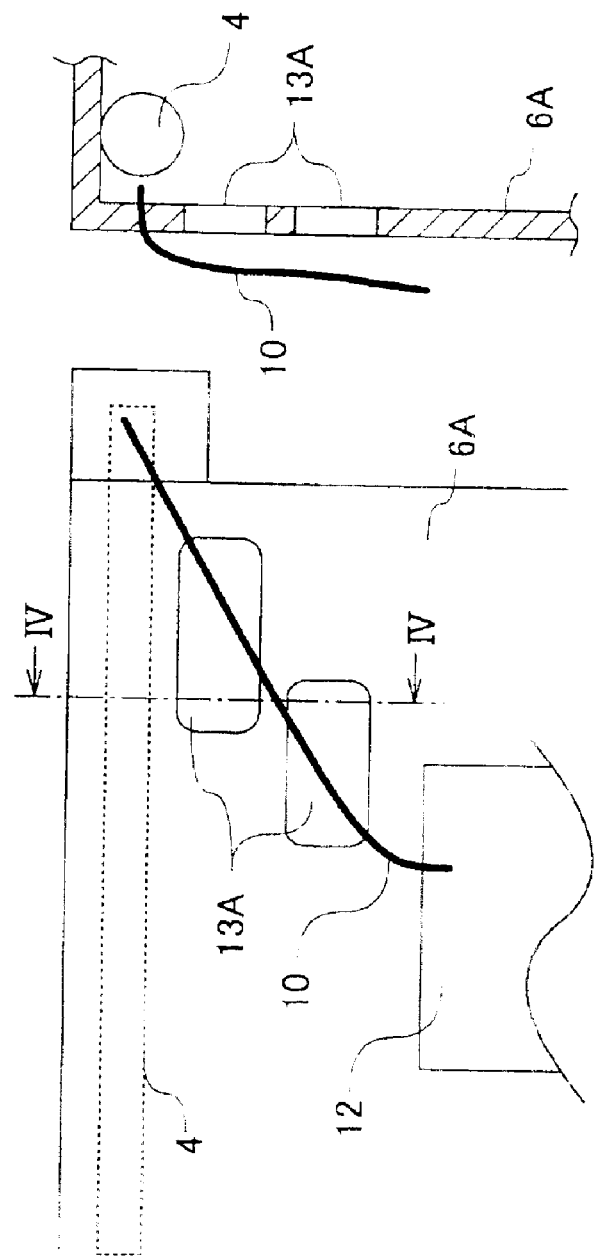

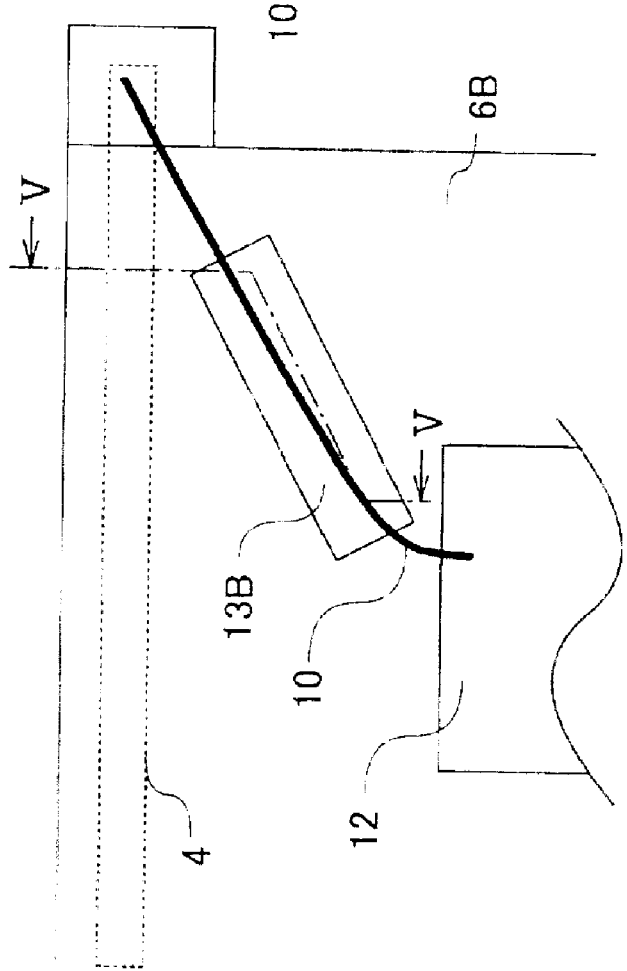

DISPLAY APPARATUS AND BACKLIGHT APPARATUS

BACKGROUND OF THE INVENTION

1. Field of the Invention

The present invention relates to a display apparatus, and more particularly, to a display apparatus that needs a backlight apparatus such as a liquid crystal display.

2. Description of the Related Art

Generally, in a conventional liquid crystal display, a backlight apparatus is positioned behind a liquid crystal display element. Display contents on the liquid crystal display element can be seen by light from the backlight apparatus. In such a liquid crystal display apparatus, the backlight apparatus is incorporated in a housing that accommodates the liquid crystal display element.

The backlight apparatus includes a light-emitting source such as a linear fluorescent tube, for example. A tabular light guide plate is provided adjacent to the light-emitting source. Light from the light-emitting source is incident on the tabular light guide plate, spreads and diffuses within the light guide plate, and is emitted from a whole surface of the light guide plate toward the liquid crystal display element.

The light-emitting source emits light by being provided with electric power. Accordingly, electric wires for providing the electric power are connected to the light-emitting source. In many cases, a linear fluorescent tube is used as the light-emitting source since it is necessary to efficiently emit the light with a small amount of electrical power. Thus, relatively high voltage from 800V to 1000v is applied to the light-emitting source through the electric wires.

In the backlight apparatus using the linear fluorescent tube as mentioned above, the light-emitting source and light guide plate are accommodated in a case. In order to reduce a thickness of the backlight apparatus, a metal case is used in many instances. A power supply circuit such as an inverter circuit for providing power to be supplied to the fluorescent tube is provided behind the metal case. Thus, in order to provide the power to the light-emitting source, coated electric wires connect the inverter circuit and the fluorescent tube. Since size including thickness of the liquid crystal display apparatus including the backlight apparatus is reduced, a part of the coated wires may extend close to or contact the metal case.

The coated wires are coated by an insulating layer of vinyl or the like, for example. For this reason, an electric short does not occur when the coated wires contact the metal case. However, when the coating is thin, it is conceivable that the current slightly leaks from the coated wires to the metal case. When the current leaks in this manner, the voltage applied to the fluorescent tube is decreased, and a problem occurs in that sufficient luminescent intensity (brightness) as the backlight apparatus is not obtained.

SUMMARY OF THE INVENTION

A general object of the present invention is to provide an improved and useful backlight apparatus and display apparatus that can prevent a leak of the current from electric wires providing power to a light-emitting source of the backlight apparatus and can maintain sufficient luminescent intensity of the light-emitting source in which the above-mentioned problems are eliminated.

In order to achieve the above-mentioned object, there is provided according to one aspect of the present invention, a display apparatus comprising: a display element; a backlight apparatus provided behind the display element and having a metal case; and a housing accommodating the display element and the backlight apparatus, wherein electric wires for providing power to the backlight apparatus extend between the metal case of the backlight apparatus and the housing, and at least one opening is provided in the metal case in a part where the electric wires extend.

Additionally, there is provided according to another aspect of the present invention, a by backlight apparatus provided behind a display element comprising: a light-emitting source; a light guide plate spreading and diffusing light from the light-emitting source and radiating the light from a surface thereof; a metal case accommodating the light emitting source and the light guide plate; a power supply circuit provided on a reverse side of the metal case for providing power to be supplied to the light-emitting source; and electric wires, each having an end connected to the light-emitting source and an opposite end connected to the power supply circuit; wherein at least one opening is provided in the metal case in a part where the electric wires extend.

According to the present invention, even when a distance between the metal case of the backlight apparatus and the housing of the display apparatus becomes short, and the electric wires and the metal case come close to each other, since the opening in the metal case is provided in the part where the electric wires extend, the electric wires hardly contact the metal case. Thus, it is possible to reduce leaking current that flows from the electric wires to the metal case. Thereby, it is possible to prevent a voltage drop of the voltage provided to the light-emitting source of the backlight apparatus and to maintain sufficient luminescent intensity of the backlight apparatus. Accordingly, a reliable backlight can be provided while using a metal case and narrowing the distance between the metal case and the housing so as to reduce a thickness of the display apparatus.

Other objects, features and advantages of the present invention will become more apparent from the following detailed description when read in conjunction with the following drawings.

BRIEF DESCRIPTION OF THE DRAWINGS

FIG. 2A is a bottom plan view, and FIG. 2B is a side view;

FIGS. 4A and 4B are schematic diagrams each showing a part of a backlight apparatus according to a second embodiment of the present invention. FIG. 4A is a bottom plan view, and FIG. 4B is a sectional view taken along a line IV—IV in FIG. 4A; and FIGS. 5A and 5B are schematic diagrams each showing a part of a backlight apparatus according to a third embodiment of the present invention. FIG. 5A is a bottom plan view and FIG. 5B is a sectional view taken along a line V—V in FIG. 5A.

DETAILED DESCRIPTION OF THE PREFERRED EMBODIMENTS

A description will be given of embodiments of the present invention with drawings.

Figure 1:
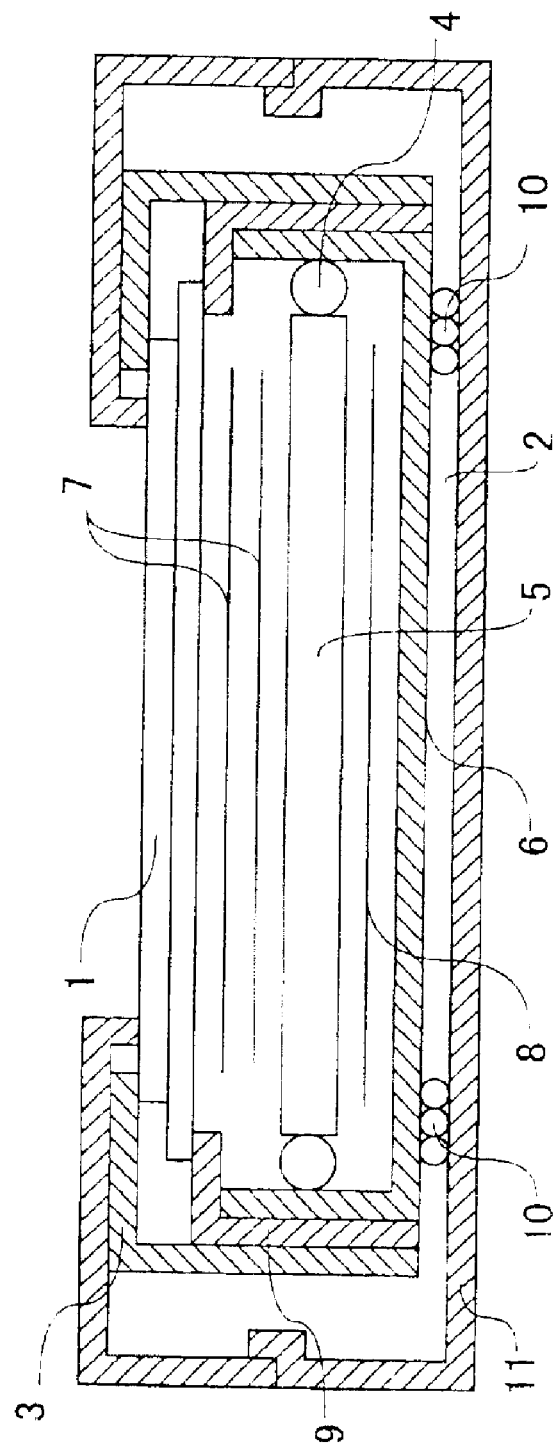
FIG. 1 is a cross-sectional view of an outline structure of a display apparatus according to the present invention.

FIG. 1 is a cross-sectional view of an outline structure of a display apparatus according to the present invention. In FIG. 1, a display element 1 made of a liquid crystal display element, for example, and a backlight apparatus 2 are mounted to a display apparatus cover 3. Then, the display apparatus cover 3 is accommodated in a housing 11 made of resin, for example, and the display apparatus is completed.

The backlight apparatus 2 includes fluorescent tube lamps 4 that are light-emitting sources, a light guide plate 5 that spreads and diffuses light from the fluorescent tube lamps 4 and radiates the light from a surface, and a backlight frame 6 as a case that accommodates the fluorescent tube lamps 4 and light guide plate 5. Further, in the backlight frame 6, optical sheets 7 are placed on a front side of the light guide plate 5 so as to adjust the light radiated from the light guide plate 5. In addition, on a reverse side of the light guide plate 5, a reflection sheet 8 is provided so as to reflect the light radiated from a back of the light guide plate 5 and to return the light to the light guide plate 5. Moreover, the backlight frame 6 is mounted to a cover 9 extending partially over the backlight and the cover 9 is mounted to the display apparatus cover 3.

In the example shown in FIG. 1, the fluorescent tube lamps 4 are positioned on each side of the light guide plate 5. The pair of the fluorescent tube lamps 4 emit light to the light guide plate 5 from both sides of the light guide plate 5. Further, FIG. 1 shows a cross-sectional view that is perpendicular to an extending direction of the fluorescent tube lamps 4. The fluorescent tube lamps 4 extend in a direction perpendicular to the page of FIG. 1.

A plurality of coated electric wires or cables 10 for providing power are connected to both ends of each of the fluorescent tube lamps 4. In FIG. 1, three cables 10 are provided for each of the fluorescent tube lamps 4, and those fluorescent tube lamps 4 are shown by a sectional view. It is possible for two cables 10 to provide power to each of the fluorescent tube lamps 4 by connecting a different cable 10 to each end of the fluorescent tube lamps 4. However, in order to apply different voltages and to obtain different intensities of light emission, more than three cables 10 may be provided for each fluorescent tube lamp 4.

A power supply circuit (not shown) is provided on the back of the backlight frame 6 as an inverter circuit formed on a board, for example. The power supply circuit provides power that is supplied to the fluorescent tube lamps 4. Therefore, the cables 10 have parts that extend on the back of the backlight frame 6. The cables 10 shown in FIG. 1 correspond to such parts that extend in the back.

As mentioned above, the liquid crystal display apparatus is generally covered by the housing 11 made of plastic. Thus, the parts of the cables 10 that extend in the back of the backlight frame 6 are positioned in a space between the housing 11 and the backlight frame 6. In order to reduce a thickness of the liquid crystal display apparatus, it is necessary to make the space between the housing 11 and the backlight frame 6 as small as possible. Accordingly, as shown in FIG. 1, the cables 10 are very close to or contact the backlight frame 6. Additionally, in order to reduce a thickness of the backlight apparatus, the backlight frame 6 is made of metal so as to reduce the thickness and yet secure sufficient strength.

In the liquid crystal display apparatus having the above-mentioned structure, there is the possibility that the cables 10 contact and are pressed against the backlight frame 6 made of metal and that leaking current flows from the contacting parts of cables 10 to the backlight frame 6. Especially, in a case where the insulating coating of the cables 10 is made thin in order to reduce the thickness of the liquid crystal display apparatus, and in a case where the space in which the cables 10 extend is made small, the leaking current from the cables 10 to the backlight frame 6 increases. The present invention prevents a voltage drop of the voltage supplied to the fluorescent tube lamps 4 by making such leaking current as small as possible.

Figure 2:
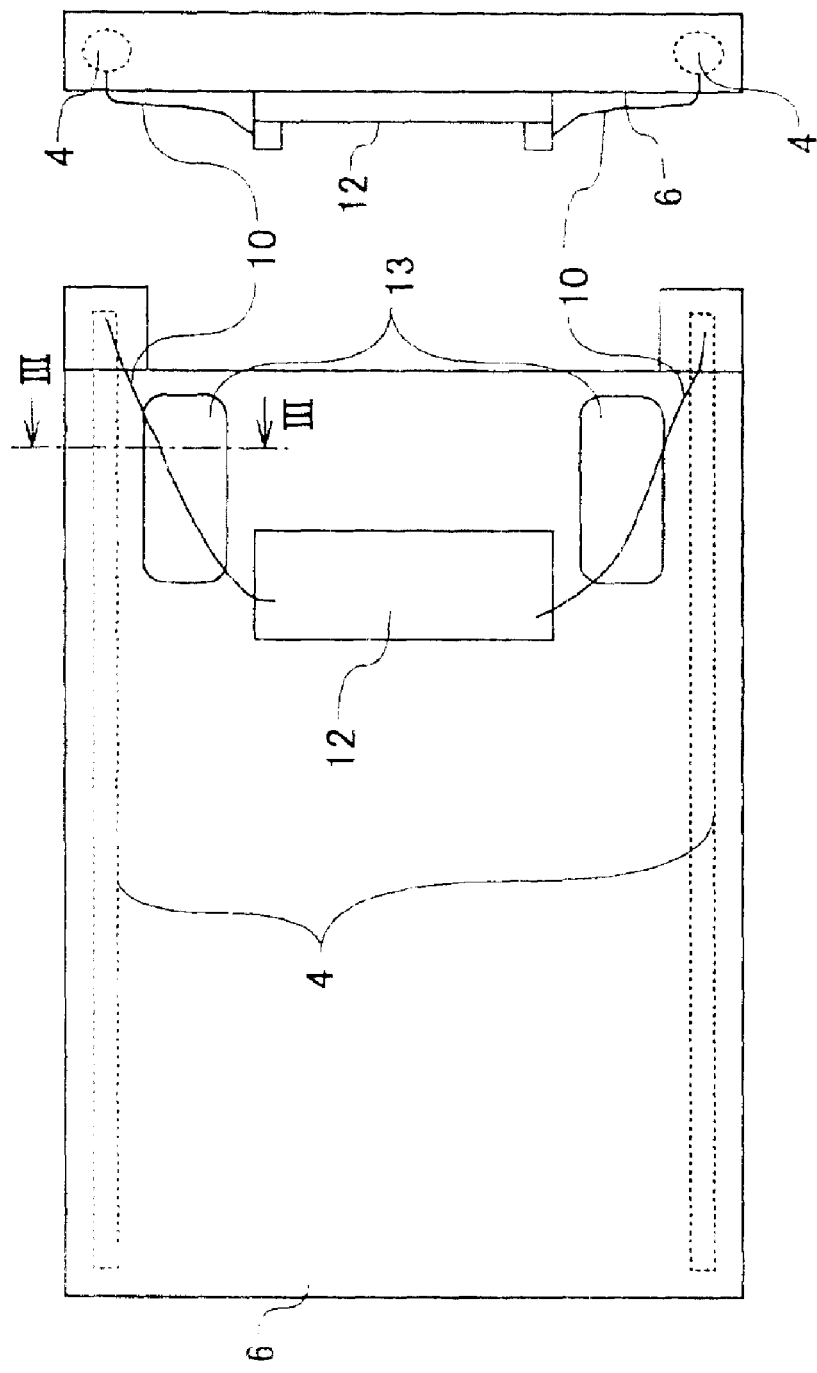
FIGS. 2A and 2B are schematic diagrams each showing a backlight apparatus according to a first embodiment of the present invention.

Next, referring to FIGS. 2A and 2B, a first embodiment of the present invention is explained. FIGS. 2A and 2B show a backlight apparatus according to the first embodiment of the present invention. FIG. 2A is a bottom plan view, and FIG. 2B is a side view. It should be noted that the bottom plan view of FIG. 2A shows a state where the fluorescent tube lamps 4 extend in left and right directions.

As shown in FIGS. 2A and 2B, in the first embodiment of the present invention, a board 12 is attached to the back of the backlight frame 6. The inverter circuit is formed on the board 12 as the power supply circuit (not shown). Then, the cables 10 connect terminals of the board 12 and terminals of the fluorescent tube lamps 4. Further, in FIGS. 2A and 2B, for the sake of simplicity, only one cable 10 is shown for each of the fluorescent tube lamps 4. However, practically, the number of the cables 10 for a single fluorescent tube lamp 4 is two or more.

Figure 3:
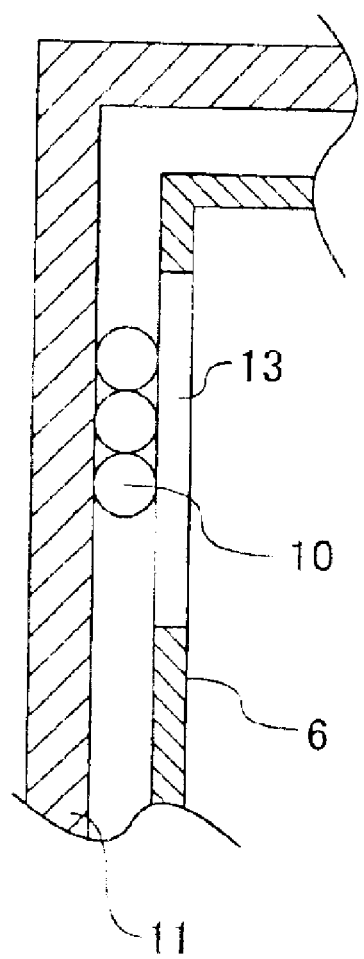
FIG. 3 is an enlarged fragmentary cross-sectional view taken along a line III—III in FIG. 2A.

As shown in FIG. 2B, each of the cables 10 extends from an end of the fluorescent tube lamp 4 to the back of the backlight frame 6, and reaches the board 12 along the back of the backlight frame 6. In this embodiment, openings 13 are provided in the backlight frame 6 in parts where the cables 10 run along. That is, since the cables 10 hardly contact the backlight frame 6, parts from which the current leaks are eliminated. Further, FIG. 3 is an enlarged fragmentary cross-sectional view taken along a line III—III.

As described above, in this embodiment, the opening 13 is provided for each of the parts where the cables 10 extend. For this reason, though the backlight frame 6 as the case is made of metal, the leaking current hardly flows from the cable 10 to the backlight frame 6. Thus, it is possible to reliably apply sufficient voltage to the fluorescent tube lamps 4. Accordingly, it is possible to prevent a luminescent intensity shortage due to a voltage drop and to always maintain the brightness of the backlight apparatus of the display apparatus at a sufficient value.

Referring to FIGS. 4A and 4B, a second embodiment of the present invention is explained. FIGS. 4A and 4B are schematic diagrams each showing a part of a backlight apparatus according to the second embodiment of the present invention. FIG. 4A is a bottom plan view and FIG. 4B is a sectional view taken along a line IV—IV in FIG. 4A.

A backlight frame 6A shown in FIG. 4A has a plurality of openings 13A (two openings shown in FIG. 4A) in a part where the cable 10 extends. In other words, in order to reduce the strength reduction of the backlight frame due to the openings 13 shown in FIG. 2, each of the openings 13 is divided into several openings so as to form the openings 13A. It is preferable that the plurality of openings 13A be aligned along a direction in which the corresponding cables 10 extend.

Referring to FIGS. 5A and 5B, a third embodiment of the present invention is explained. FIGS. 5A and 5B are schematic diagrams each showing a part of a backlight apparatus according to the third embodiment of the present invention. FIG. 5A is a bottom plan view and FIG. 5B is a cross-sectional view taken along a line V–V in FIG. 5A.

A backlight frame 6B shown in FIGS. 5A and 5B has a long and narrow opening 13B along the cable 10 in a part where the cable 10 extends. That is, in order to reduce the strength reduction of the backlight frame due to the openings 13 shown in FIG. 2A, each of the openings 13 is formed to be the long and narrow opening 13B so as to reduce an area of the opening and to maintain the strength of the backlight frame 6B.

As described above, a shape or the number of the openings provided in the backlight frame is not limited to the shapes or the numbers specifically shown in the above-mentioned embodiments. Any number of openings of various shapes may be formed.

Additionally, the explanation has been given by taking the liquid crystal display apparatus as an example as the display apparatus. However, the present invention can be applied to a display element other than the liquid crystal display element that requires a backlight apparatus.

The present invention is not limited to the specifically disclosed embodiments, and variations and modifications may be made without departing from the scope of the present invention.

The present application is based on Japanese priority application No. 2001-399593 filed on Dec. 28, 2001, the entire contents of which are hereby incorporated by reference.

What is claimed is:

1. A display apparatus, comprising:

a display element;

a backlight apparatus provided behind the display element and having a metal case; and housing accommodating the display element and the backlight apparatus, wherein electric wires for providing power to the backlight apparatus extend between the metal case of the backlight apparatus and the housing, and at least one opening is provided in a back of the metal case in a part along which the electric wires extend, so as to prevent a leakage current from the electric wires to the metal case.

2. The display apparatus as claimed in claim 1, wherein the backlight apparatus includes:

a light-emitting source;

a light guide plate spreading and diffusing light from the light-emitting source and radiating the light from a surface thereof; and a power supply circuit for supplying electricity to the light-emitting source, wherein an end of each of the electric wires is connected to the light-emitting source and an opposite end of each of the electric wires is connected to the power supply circuit.

3. The display apparatus as claimed in claim 1, wherein a plurality of openings are provided in the back of the metal case in parts along which the electric wires extend.

4. The display apparatus as claimed in claim 1, wherein the opening has an elongated shape extending along a direction in which the electric wires extend.

5. A backlight apparatus, comprising:

a light-emitting source;

a light guide plate spreading and diffusing light from the light-emitting source and radiating the light from a surface thereof;

a metal case accommodating the light emitting source and the light guide plate;

a power supply circuit provided on a back of the metal case for providing power to be supplied to the light-emitting source; and electric wires, each having an end connected to the light-emitting source and an opposite end connected to the power supply circuit;

wherein at least one opening is provided in the back of the metal case in a part along which the electric wires extend, so as to prevent a leakage current from the electric wires to the metal case.

\* \* \* \* \*